United States Patent
Blanc et al.

(10) Patent No.: US 7,644,152 B2
(45) Date of Patent: Jan. 5, 2010

(54) COMMUNICATION OF MESSAGES IN A SYSTEM

(75) Inventors: Dominique Blanc, Västerås (SE); Martin Strand, Västerås (SE); Patrik Nordling, Eskilstuna (SE); Tommy Kettu, Västerås (SE)

(73) Assignee: ABB AB, Västerås (SE)

( * ) Notice: Subject to any disclaimer, the term of this patent is extended or adjusted under 35 U.S.C. 154(b) by 669 days.

(21) Appl. No.: 10/491,406

(22) PCT Filed: Oct. 3, 2002

(86) PCT No.: PCT/SE02/01815

§ 371 (c)(1),
(2), (4) Date: Oct. 20, 2004

(87) PCT Pub. No.: WO03/032099

PCT Pub. Date: Apr. 17, 2003

(65) Prior Publication Data

US 2005/0038853 A1    Feb. 17, 2005

(30) Foreign Application Priority Data

Oct. 5, 2001    (GB) ................................. 0124014.2

(51) Int. Cl.
*G06F 15/16*    (2006.01)
*G06F 15/173*    (2006.01)

(52) U.S. Cl. ...................... 709/224; 709/206; 709/207; 709/238; 709/239

(58) Field of Classification Search ................. 709/203, 709/206, 318, 207, 224, 238, 239; 707/10; 726/14; 455/417
See application file for complete search history.

(56) References Cited

U.S. PATENT DOCUMENTS

| 6,260,148 | B1 * | 7/2001 | Aggarwal et al. ............. 726/14 |
| 6,854,007 | B1 * | 2/2005 | Hammond .................. 709/206 |
| 2001/0055963 | A1 * | 12/2001 | Cloutier ...................... 455/417 |
| 2002/0046299 | A1 * | 4/2002 | Lefeber et al. .............. 709/318 |
| 2002/0087643 | A1 * | 7/2002 | Parsons et al. .............. 709/206 |
| 2005/0038789 | A1 * | 2/2005 | Chidambaran et al. ........ 707/10 |

FOREIGN PATENT DOCUMENTS

| DE | 19654859 C1 | 12/1998 |
| GB | 2 347 234 A | 8/2000 |
| GB | 2 370 390 A | 6/2002 |
| WO | WO 99/49680 A1 | 9/1999 |
| WO | WO 01/02953 A1 | 1/2001 |
| WO | WO 02/054749 A1 | 7/2001 |

* cited by examiner

*Primary Examiner*—Quang N. Nguyen
(74) *Attorney, Agent, or Firm*—Venable LLP; Eric J. Franklin

(57) ABSTRACT

A method and arrangement for selecting a recipient of a message. The method can be used in association with a control system that includes a processor adapted for object oriented data processing and a communicator for communication with a plurality of recipients. In the method a recipient for a message that is associated with an object is selected based on information regarding at least one association the object has with objects representing the recipients. A communication system for communication of control messages, a data signal generated for communication in a computerized control system, and a user terminal for a control system are also provided.

19 Claims, 6 Drawing Sheets

| Source: | | |
|---|---|---|
| Alarm list1 | | |
| Recipient: | Device: | Time Out: |
| 1st  Tommy | SMS#1234567 | 5 min |
| 2nd  Tommy | email#tommy@ax.co | 15 min |
| 3rd  Patrick | SMS#2234567 | 5 min |
| 4th  HVAC-team | Broadcast to all | 15 min |

```
┌─────────────────────────────────────────────┐
│ A data object regarding a device for receiving │
│ messages in association with a real world entity is │
│ generated                                    │
└─────────────────────────────────────────────┘
                      ↓
┌─────────────────────────────────────────────┐
│ Indication of the generated data object is stored in an │
│ aspect of an object representing the real world entity │
│ in a data processing system adapted for object │
│ oriented data processing                     │
└─────────────────────────────────────────────┘
                      ↓
┌─────────────────────────────────────────────┐
│ An event associated with the real world entity │
│ triggers an alarm                            │
└─────────────────────────────────────────────┘
                      ↓
┌─────────────────────────────────────────────┐
│ A messaging function is notified about the alarm │
└─────────────────────────────────────────────┘
                      ↓
┌─────────────────────────────────────────────┐
│ The messaging function communicates a message │
│ about the alarm to at least one recipient device based │
│ on information stored in said aspect of the object │
└─────────────────────────────────────────────┘
                      ↓
┌─────────────────────────────────────────────┐
│ The message is acknowledged by the selected │
│ recipient                                    │
└─────────────────────────────────────────────┘
```

Fig. 5

COMMUNICATION OF MESSAGES IN A SYSTEM

FIELD OF THE INVENTION

The present invention relates to communication of messages, and more particularly, but not exclusively, to communication of messages in a control system.

BACKGROUND OF THE INVENTION

A control system is typically used for obtaining efficient and safe operation of a facility and/or for provision of information regarding a facility. To provide these objectives a control system may be adapted to monitor, analyse and manipulate the facility under control and to communicate information associated with the facility to an operator. In a typical modern control system at least part of the control function is computerised.

Examples of the facilities to be controlled by a control system include various industrial facilities. An industrial facility may be a manufacturing and processing system such as a chemical or petroleum plant, a pulp and/or paper mill, a steel and/or metal plant, a factory or other production facility. Examples of other facilities, without being limited to these, include arrangements such as traffic or storage management systems, communication systems, buildings and other constructions and so on. The term facility shall also be understood to refer to any subsystem e.g. in an industrial plant. A subsystem may be e.g. a manufacturing cell, a group or equipment, a machine or a process stage and so on.

For the provision of the control functions a control system typically comprises equipment such as data processing means, different information collecting and other monitoring means (e.g. different sensors, meters) and so on. A control system may also comprise means for providing communication media between various entities associated with the system.

A control system may be adapted to generate various messages to be communicated between various entities such as a data processing unit and a user terminal. The messages may concern various events associated with the facility to be controlled. For example, a message such as an alarm may be transmitted in response to an event such as a detected abnormality in an entity of the facility monitored by the control system.

The control system may communicate the messages to at least one operator of the facility via an appropriate communication media. The communication may be controlled by a messaging system. The messaging system may be especially important in applications wherein the operator is allowed to move around. That is, the operator may not necessarily be all the time on site and hence he may not be able to observe an operator station at a fixed point. If the operator moves, the communication is preferably arranged to occur via a wireless interface, although communication media that is at least partially based on fixed line communications may also be used. The skilled person is aware of various possibilities for implementing communication between a control system and a user terminal and thus these are not described in more detail herein.

The user terminal may be mobile, preferably portable terminal or a fixedly located terminal. Examples of the mobile terminals comprise, without being limited to these, mobile stations such as mobile telephones, pagers, personal data assistants (PDAs) or organisers, laptop computers and so on. Fixed operator terminals may comprise, without being limited to these, devices such as PC computers or other computer workstations, fax machines, fixed line telephone terminals, printers and so on.

A facility may be operated by several persons. For example, an industrial facility may comprise various components and/or various stages. The operators of the facility may have different responsibilities and/or may be positioned in different locations. The operators may also move and thus their location relative to the facility and/or to each other may vary. A complex system may also comprise a substantially great number of various features to be controlled. The number of different events may also be substantially high in a complex system.

A message associated with a specific entity of the facility should be communicated to an operator who has the responsibility for said entity. It may also be important to ensure that at least one operator receives the message and/or acknowledges the receipt thereof. This is considered to be especially important in complex systems that may be controlled, operated and/or served by a number of operators.

The messaging system should be such that e.g. an alarm message is received and/or acknowledged by at least one operator. However, it may also be advantageous to avoid any unnecessary transmissions to operators who do not necessarily need to receive information about the alarm. Unnecessary communication may need to be avoided e.g. because of capacity limitations of the messaging system. Furthermore, an operator may not be capable of handling more than a certain amount of messages without a risk of being provided with so much information that he/she is no longer able to cope with all received messages.

Conventionally an event related message is communicated to an operator based on information about a beforehand defined relation defined between very specific events and specific operators. That is, a specific alarm signal from e.g. a certain pump triggers a procedure wherein an alarm message is delivered to a beforehand specified address for such alarm messages. The specific recipient may have been associated with an event, a component and so on e.g. by means of a table linking events and recipients in a predefined manner.

Computer aided control systems may be implemented by integrating several different systems in a common framework. The inventors have found that maintenance and operation of such control systems may require more advanced possibilities to select and/or configure information about the recipients of the control messages than what is provided by the prior art arrangements. It might also be advantageous in some occasions if e.g. an operator could readily adjust and/or reconfigure the recipient selection procedure. This could facilitate easier changes in responsibilities and/or in the facility to be controlled. That is, there is a need for a possibility to configure more efficiently which recipient should get messages and also which messages should be sent to a selected recipient.

SUMMARY OF THE INVENTION

Embodiments of the present invention aim to address one or several of the above problems.

According to one form of the present invention, there is provided a messaging method for a system, said system comprising a data processing means adapted for object oriented data processing and communication means for communication with a plurality of recipients, the method comprising selection of a recipient for a message that is associated with an object, said object having one or more properties, wherein the selection of the recipient is based on information regarding at least one association the object has with objects representing the recipients.

According to another form there is provided a control system comprising communication means for communication with a plurality of recipients, the communication means comprising selection means arranged to select a recipient for a message that associates with an object in an object oriented data processing facility based on information included in a property of the object regarding at least one association said object has with objects representing the recipients.

According to another form there is provided a communication system for communication of control messages, the communication system comprising selection means arranged to select a recipient among a plurality of recipients for a message that is associated with an object in an object oriented data processing facility, the object having at least one property, wherein the selection is based on information regarding at least one association said object has with objects representing the recipients.

A message recipient, hereinafter recipient, may be any user of the system or any user device adapted for receiving a message.

The message may be generated in response to an event.

A verification may be accomplished to determine if the message is to be sent to at least one recipient by the communication means.

The association may be indicated by an aspect of the object representing said entity. The aspect may include a list of recipients. The aspect may include an association to another object containing information associated with the communication media to be used for communication with said at least one recipient. The aspect may include information associated with user devices enabled to receive the message.

The objects may be arranged in at least two groups of objects. The arrangement may be such that an object representing a real world entity is located in a functional structure and objects representing the recipients are positioned in a user structure. Said association between objects in two groups may provided by means of an aspect of the object representing the entity in the functional structure.

The message may be sent to a first preferred recipient in a messaging list associated with the object representing the entity. Another recipient or user device may be selected if a message is not acknowledged by the selected recipient within a predefined time.

The message may be associated with control of an industrial facility. The message may be an alarm message. The recipients may comprise operators and/or maintenance personnel of the industrial facility.

Said information regarding at least one object may be modified. The modifying procedure may comprise steps of displaying a graphical user interface and reconfiguring at least one feature of the messaging system by means of said graphical user interface.

The control system may comprise means for monitoring a facility to be controlled by the control system and for notifying the communication means that a message needs to be sent to a recipient in response to a detected event. The selection means may be adapted to select the recipient in response to said notification.

At least one of the method steps can be provided by means of a computer program product comprising program code means for performing any of the method steps when the program is run on a computer.

According to still another form there is provided a user terminal for a control system, the user terminal comprising a display for presenting a graphical user interface, the user terminal being adapted to enable configuration of features of a messaging function of the control system, said messaging function enabling communication with a plurality of recipients and comprising selection means arranged to select a recipient for a message that is associated with an object in an object oriented data processing facility based on information regarding at least one association said object has with objects representing the recipients.

The embodiments enable selection of at least one recipient based on associations objects represented by other objects may have. In addition to selection of at least one recipient some of the embodiments enable selection of messages which shall be sent to a certain recipient or only to certain recipients instead of all possible recipients.

BRIEF DESCRIPTION OF DRAWINGS

For better understanding of the present invention, reference will now be made by way of example to the accompanying drawings in which:

FIG. 5 is a flowchart illustrating the operation of one embodiment of the present invention.

DESCRIPTION OF PREFERRED
EMBODIMENTS OF THE INVENTION

Figures 1, 4:
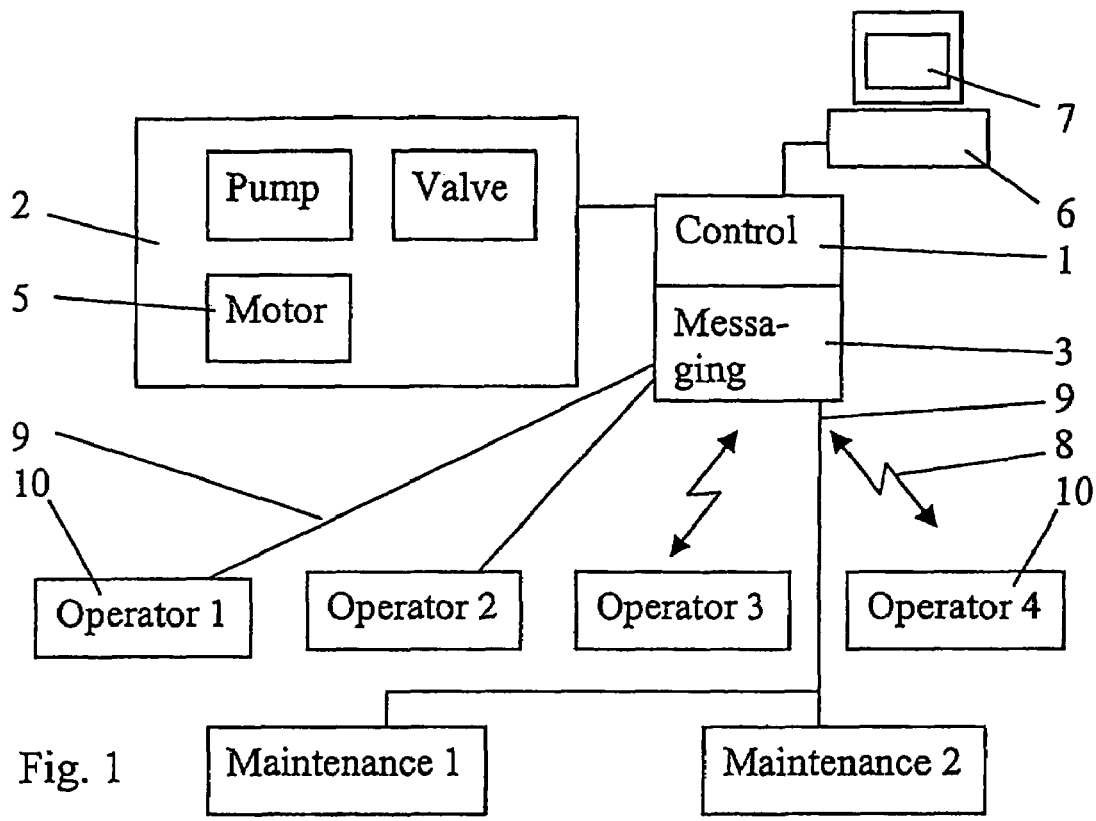
FIG. 1 is a schematic presentation of a system employing an embodiment of the present invention.
FIG. 4 shows a further embodiment.

Reference is made to FIG. 1 which shows a schematic view of a control system 1 adapted to monitor and control operation of a facility indicated by block 2. The facility may comprise any facility such as an industrial facility (e.g. a plant, factory or a part of a plant or factory), a municipal facility, an office, a building or other construction, and so on.

The facility 2 comprises a plurality of entities 5. The control system 1 is adapted to monitor each of the entities 5. Various entities that may be monitored and otherwise controlled by the control system are known, and are thus not shown or described in detail for clarity.

A user interface is provided by a user terminal 6 for a user of the control system (e.g. an operator). The user terminal 6 is connected to the control system by means of a communication link. The user terminal comprises means for enabling the user to configure features of the control system. More particularly, the user terminal 6 is provided with display means 7 adapted for providing the user with a graphical user interface (GUI). Although not shown, the user terminal may also be provided with user interface means such as a keyboard, a mouse, touch screen and other auxiliary devices.

The control system 1 is adapted for provision of control operations based on computerised data processing and more particularly, based on object oriented data processing. Object oriented programming techniques or languages refer to programming arrangements that were developed to allow re-use and extension of program code which has resulted in ease of integration of new applications in a computerised system. Examples of object oriented technology include programming languages such as C++ or Java.

The object oriented systems are adapted to process data entities that are called (data) objects. A data object may represent any real world entity such as, without being limited to these, a device or a component of a device, a cell, a line, a meter, a sensor, a sub-system, a controller, a user and so on. A data object may also represent another data object or a group of data objects. Such objects are often referred to as meta objects.

During development of a set of control instructions or control software based on the object oriented techniques the designer may determine what objects are needed for the instructions and the interrelations each of the chosen objects has with other objects. When the control program is run a functionality of the program may invoke a method provided by an object that may be stored e.g. in a database of the control system.

An object may have different properties such as aspects. Each aspect defines more precisely features such as a characteristic and/or function and/or other information associated with the object. That is, an object may be associated with one or more different aspects that represent different facets of the entity that the object represents. An aspect may provide a piece of the functionality of the object. An object may inherit an aspect from another object, principally by means of the object type of the first object.

Associated with each object is at least one property. The properties may be different and may hold various information about the entity that is represented by the object. For example, properties that may associate with objects representing a flow control loop of a processing facility may include properties such as 'NAME', 'DESCRIPTION', 'VALUE', 'SET-POINT', 'GAIN', 'OUTPUT', 'STATUS' and soon. Properties associated with objects relating to temperature measurements may comprise, for example, properties such as 'NAME', 'DESCRIPTION', 'VALUE', 'HIGH ALARM LIMIT', 'LOW ALARM LIMIT', 'STATUS' and so on. Properties such as 'NAME', 'DESCRIPTION', 'START', 'STOP', 'CURRENT STEP', 'STATUS' and so on may be associated with objects of a start-up sequence. It shall be appreciated that these examples are only given to clarify the concept of properties with no intention to limit the possible properties to the above mentioned examples.

International publication No. WO 01/02953 entitled "Method of integrating an application in a computerized system" describes a method to represent real world entities and for integration of many and various types of applications in a computerised system. The method is based on a concept where real world entities are represented as 'composite objects'. Different facets of the real world entity, such as it's physical location, the current stage in a process, a control function, an operator interaction, a simulation model, documentation about the entity and so on, are each described as different aspects of the composite object. A composite object can thus be seen as a container for one or more of such aspects. The composite object described by said WO publication is not an object in the traditional meaning of the object oriented systems but constitutes rather a container of references to such traditional objects which implement the different aspects. Each aspect or group of aspects may be implemented by an independent software application. The software application may provide its functionality through a set of interfaces that are accessible through the composite object. Another software application can thus query a composite object for a function associated with one of its aspects, and as a result obtain through the composite object a reference to the interface that implement the function.

Therefore, in the method and system described in said WO publication different types of information about the real world entity may be obtained, linked to the real world entity, processed, displayed, acted on, and so on. An application that may be used to provide some function of a real world entity uses interfaces that are independent of the implementation of the application itself. These interfaces may be used by other applications, implementing other aspects or groups of aspects of a composite object.

The WO publication No. 01/02953 describes also a method in which a software application can query a meta object such as an object representing a real world entity (entity object) for a function associated with one of its aspects. A reference to the interface that implements the requested function can be obtained through the entity object.

The control system 1 is arranged to generate messages in accordance with predefined rules. For example, an alarm may be generated in response to a signal indicating overheating of a component of the facility 2.

The control system is provided with a messaging function 3 for transportation of control messages to a plurality of users 10 of the control system. The arrangement is preferably such that the control system 1 provides the messaging system 3 with an indication of an event associated with the facility. The messaging system may be provided with instructions to communicate an appropriate message to at least one of the users of the control system.

The messaging system 3 is adapted to handle indications generated by the monitoring functions of the control system 1 and to subsequently communicate appropriate information about the events to a selected recipient or recipients. For example, the messaging system 3 may be adapted to generate a message in response to a signal about an alarm and to address the message about the alarm to an appropriate operator that is selected among the operators 'Operator 1' to 'Operator 4' or to one of the maintenance groups 'Maintenance 1' or 'Maintenance 2'.

The recipients 10 may be provided with appropriate user terminal equipment for receiving messages from the messaging system 3. The communication media between the control system and the recipient terminals may be based on any appropriate communication system and may employ at least one wireless interface and/or at least one fixed line interface. For example, a message may be communicated via a wireless interface 8 or via a fixed line interface 9 between the control system and the recipient. The user terminal equipment may be, for example, adapted for receiving messages that are communicated as email messages, pager messages, fax messages, short message service (SMS) messages, mark-up language file messages, telephone calls and so on. The SMS messages may comprise a string of characters that may provide information and/or executable code. The mark-up language messages may be based on HTML (Hyper Text Mark-up Language), XML (Extended Mark-up Language) or any other mark-up language created based on the Standard Generalised Mark-up Language (SGML) format. It shall be appreciated that the format of the messages and the communication system as such do not form an essential feature of the present invention. These are thus not explained in any greater detail herein.

The inventors have found that information about the associations the objects presenting objects such as real world entities have with other objects can be utilised by the messaging system when selecting appropriate recipients for messages. A recipient who shall get the message generated in response to indication of an event may be selected based on information of e.g. the relations between objects representing the operators and objects that generated the alarm signals.

Figure 2:
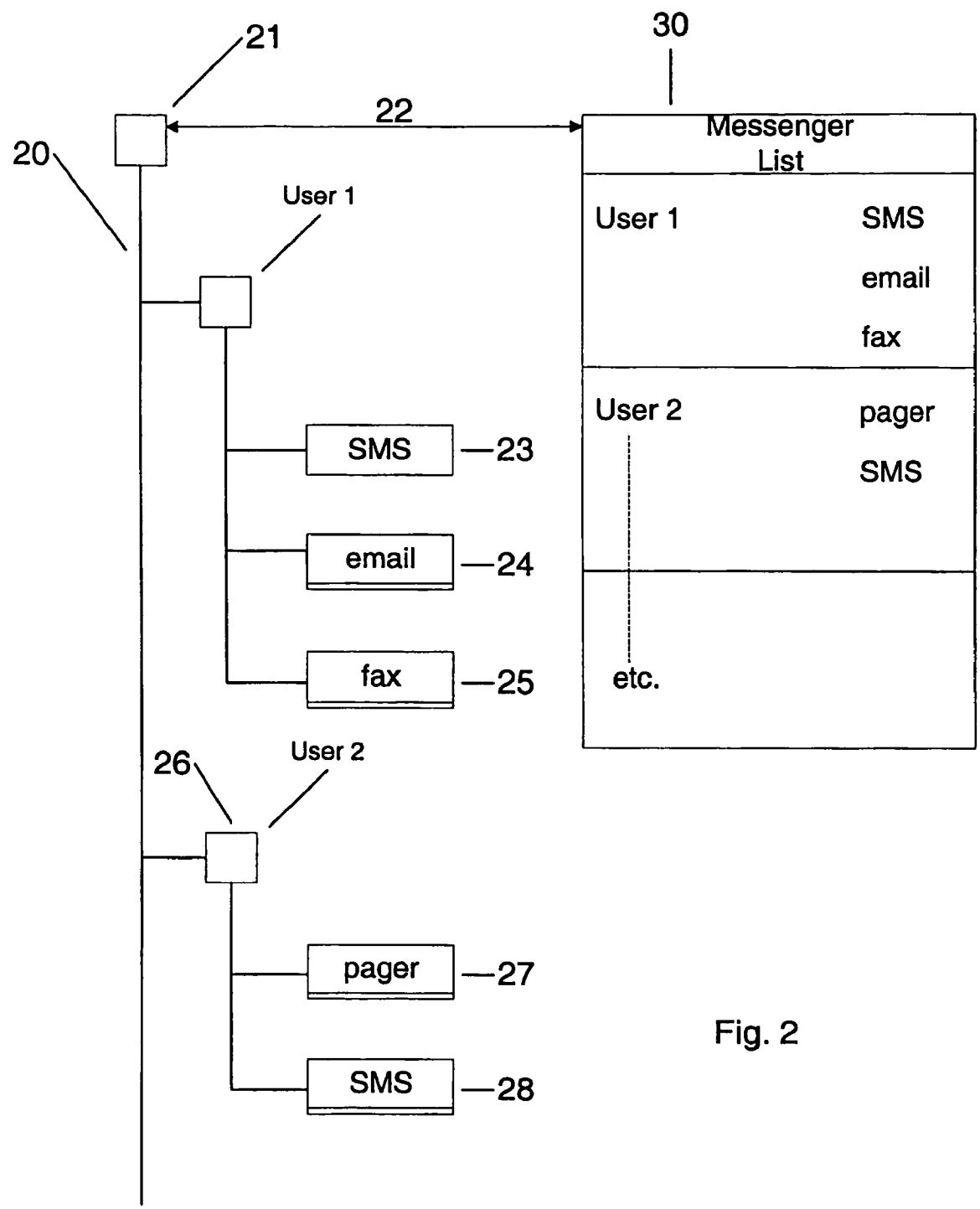
FIG. 2 shows an embodiment of the present invention.

As shown in FIG. 2, the objects may be arranged in hierarchical structures 20 to have parent-child relations. Such a tree like structure is typically arranged such that a "main" parent object 21 is located at the beginning of the tree and often referred to as the root object. A plurality of possible child objects or sub-objects 22 to 28 are hierarchically dependent from the main object. The child object may form subgroups such that a child may parent a plurality of further child objects.

The monitoring function of the control system is adapted for detecting events such as failures or other abnormalities in the facility. The monitoring function may model the facility based on an appropriate object oriented technology. The relations between real world entities 5 and possible recipients 10 of FIG. 1 may be described by means of a such object model. That is, the object model can be used to describe relations an object (e.g. a device in a factory) may have with recipients (e.g. operators or user devices) for the purposes of the messaging function.

The associations between a real world entity and the possible recipients may be described by means of properties of an object representing the real world entity. The associations may be described, for example, by means of a messenger list that associates with an object representing the real world entity. An object representing e.g. a device of a facility or a process stage may be provided with a messenger list during the configuration of the object.

FIG. 2 shows a messenger list 30 that has been generated based on a predefined messaging strategy or similar scenario defining how messages shall be sent to recipients. The messenger list 30 is preferably implemented as an aspect of an object that represents a specific real world entity, such as a pump or a system such as ventilation.

A messenger list can be configured to send messages to any kind and any number of recipients via any kind of communication media. The number of recipients is not limited. The recipients may be sorted in any order. Since the configuration of data object is substantially easy the use of messaging list enables easy configuration of the messaging function without requiring configuration of the features of the control and/or messaging system itself.

Figure 3:
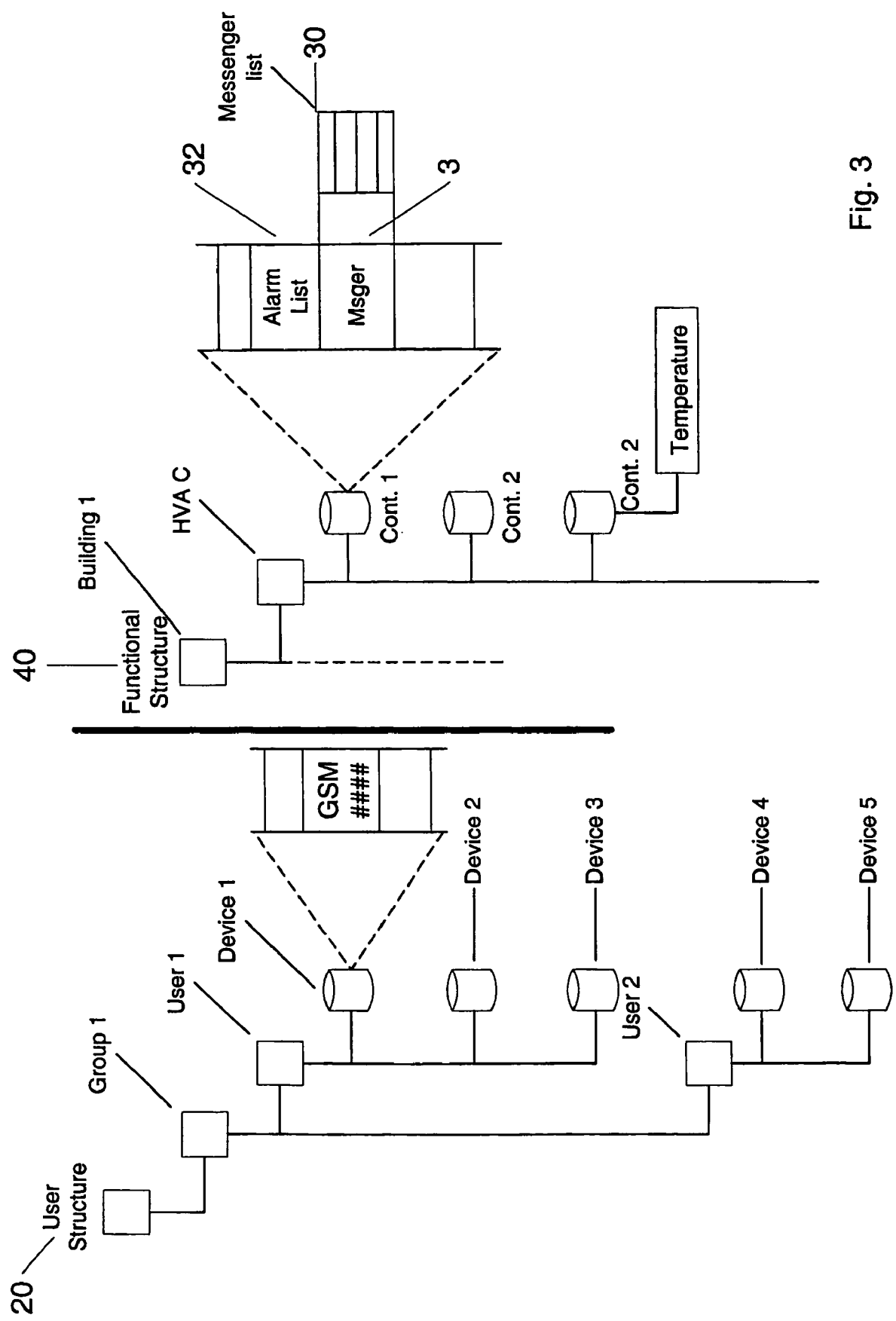
FIG. 3 shows an object model comprising a plurality of object groups.

FIG. 3 shows an embodiment wherein the associations are provided between objects that are located in different object structures. In FIG. 3 the 'user structure' 20 corresponds to the object tree of FIG. 2 and includes objects that associate with the users of the system. The second object group comprises a functional structure 40 including objects that represent the real world entities to be supervised and/or controlled by the system. The functional structure 40 is modelled based on a functional view of real world objects of the facility to be controlled. The functional structure may comprise e.g. a root object 'Building 1' and sub-objects such as 'HVAC' (heating and ventilation). This object may then have further child objects that associate with the heating and ventilation system HVAC.

When an alarm originates from an object belonging to the ventilation system HVAC in the functional structure 40 the messaging system 3 studies the messenger list 30 associated with the object. The recipient of the message about the alarm is then selected by the messaging system 3 from the user structure 20 based on information obtained from the messenger list 30. As mentioned above, a messenger list may be provided as a property such as an aspect of the object representing the real world entity for the control system. The aspect includes an association to another object, such as to an object representing an appropriate user device.

The recipient of the message is preferably the first entry on the list, i.e. user 1. The messaging list 30 may also or alternatively define that the message is communicated to an SMS device 23 of the user 1. If the delivery is not successful within a certain period of time the message may then be communicated to the next user device on the list (email device 24 in FIG. 2) and so on. Examples of the possibilities for the delivery of a message to a recipient (either a user or a user device) or a plurality of recipients are given below.

In a scenario a message is sent to at least one user device. A message may be sent to all devices 23 to 25 of a selected user or to a subset of devices of the selected user or just to one device of the selected user. It is also possible to send a message to all users and/or devices on the list 30, e.g. in the event of a major urgency.

The arrangement may be such that when a message is to be communicated the messaging function looks for an appropriate recipient in the messaging list. After having found the device object representing the recipient the messaging function instructs that device object to deliver the message. The messaging function does not need to give any specific instructions regarding the manner how the delivery should occur. Instead, required information regarding the delivery is in the device object or can be found based on information in the device object. For example, device object 'SMS' that the list 30 associates with the 'user 1' may be instructed to deliver the message. The message is then delivered to the user in manner that is dependent on the device object rather than the messaging function.

According to another scenario the messages are sent to users rather than devices of the users. In FIG. 3 an object representing 'user 1' is located in the user structure 20 while objects 'cont.1', 'cont.2', 'cont.3' representing characteristics i.e. real world entities including alarms are located in the functional structure 40. The couplings between the users (e.g. operators and maintenance personnel) and their devices in the user structure 20 and the objects capable of alarms in the functional structure 40 are accomplished by the messaging function 3. More particularly, the messenger list 30 of the messaging function 3 provides the required references between the user groups and devices in the user structure 20 and the objects of the facility in the functional structure 40.

According to a third scenario a plurality of different recipient objects may be collected together in structures, as described in WO 01/02953 referred to above. Different structures may represent different types of objects controlled by the control system and also different groups of users. The objects representing real world objects such as entities to be monitored by the control system and the recipients of control messages may be arranged in various characteristic structures based on features and characteristics of the entities that are represented by the objects. The structures may also be used to describe relations between different objects.

FIG. 3 also shows an alarm list 32. The alarm list or similar functionality can be used for selection of the messages containing alarm information that are to be communicated by means of the messaging function. The alarm list may contain information associated with active alarms an object may have. The alarm list may be used in filtering the messages generated by the control system. That is, a coupling between the alarm list and the messaging function enables filtering of messages such that the messaging function becomes notified only of those specific alarms that have been defined beforehand as alarms requiring communication of messages by means of the messaging function.

To implement this the messaging list may be adapted to monitor the alarm list. In response to detecting an alarm in the alarm list that needs to be communicated to at least one recipient the messaging function proceeds accordingly. The alarm list functionality may be arranged to filter alarm indication such that the messaging function is notified only of predefined alarms.

One or more alarm lists may be provided for objects representing real world objects. A single alarm list may be provided for all objects e.g. in a plant. An alarm list may also be provided for a logical group of objects such as for objects associated with a room of a plant or for a certain type of objects.

The alarm list may also provide information regarding the alarms the children of an object in a certain group of objects has.

The messenger list 30 and/or alarms list 32 can be re-configured whenever this is required. For example, an operator may re-configure the lists by means of the user terminal 6 and a graphical user interface (GUI) displayed to him/her by the display 7 of FIG. 1. The GUI may present the configuration of the messenger list and/or various associations an object has. The operator may modify the list and/or the associations e.g. by means of a keyboard, touch screen, a mouse and so on. The user terminal and the control system may communicate via a wireless interface.

The messaging system may also be provided with fall back behaviour that operates in accordance with a beforehand defined messaging strategy. That is, if the messaging systems fails to deliver a message or does not receive an acknowledgement of the delivery of a message to a selected device, the message may be delivered to another device and/or to other recipients.

FIG. 4 shows a possible strategy for transportation of messages in a system providing fall back behaviour. The fall back operation is initiated in response to detection that the user of the 1$^{st}$ recipient device (i.e. 'Tommy') has not acknowledged the message within a predefined period of time.

It may be advantageous that the user has to actively acknowledge the receipt of a message. The user action can be used in ensuring that the user has actually received the message. The user may acknowledge the message e.g. by sending a response to the messaging function, the response including the original message. Based on the response the messaging function may then determine that the user has received and also read the message. It shall be appreciated that there are several other possibilities for the acknowledgement such as those based on use of special tags or other appropriate identifiers of messages and/or users.

The destination device list for 'Tommy' is shown to include several possibilities. That is, the recipient 'Tommy' is shown to have two devices. In this example the messaging function selects first device 1 that is a SMS enabled device with number 1234567. If Tommy does not acknowledge the message by the first device within a certain time frame (5 minutes) the message is sent by the second device on the list. In the example it would mean an email to Tommy.

If Tommy does not acknowledge the email message within the next fifteen minutes, the message is sent to another recipient, that is to Patrick's SMS enabled device. If Patrick does not acknowledge the receipt of the message with next five minutes, the message is broadcast to the entire HVAC team. The message may be broadcast to all possible devices that are associated with the team and the messaging function is made aware of.

The time frames and/or the recipients and the destination devices may be configurable e.g. by means of the user terminal 6 of FIG. 1. The destination devices may be taken from appropriate user structure (see FIGS. 2 and 3).

Any appropriate operation may follow if none of the members of the HVAC team acknowledges the receipt and reading of the message. For example, a message may be transmitted to all devices the messaging function is aware of or the messaging system may retry after a certain time period, starting from Tommy again.

FIG. 5 illustrates steps for operation of the messaging function in accordance with an embodiment. During the configuration of the control system a messaging list or similar is generated. The list may be generated in accordance with a predefined messaging strategy and includes at least one object regarding at least one recipient device (e.g. a telephone, a GSM, email device and so on). The generated list is stored as an aspect of an object representing a real world object (e.g. a pump) in question. This provides easily accessible information about the messaging strategy associated with the object.

A monitoring function of the control system detects an event. The event triggers generation of an alarm and subsequently a message containing information about the alarm. According to an embodiment, although not necessary in all embodiments, the message about the alarm may be displayed by the display 7 of the user terminal 6 of FIG. 1.

The messaging function may generate a data signal for communication to at least one recipient selected based on the beforehand configured messaging list. A data part of the data signal comprises information representing the message associated with an object representing an entity, the message being generated based on indication of the event requiring communication to at least one recipient.

The messaging strategy may also define that the generated message needs to the communicated to at least one user device by means of the messaging system. The messaging function is thus notified of the alarm after which the messaging system selects at least one recipient based on the information provided by the aspect of an object and the message is communicated accordingly.

The strategy may also be such that different recipients are selected in different times. For example, messages about alarms may be communicated to different recipients depending on the time of the day, the day of the week and so on.

Figure 6:
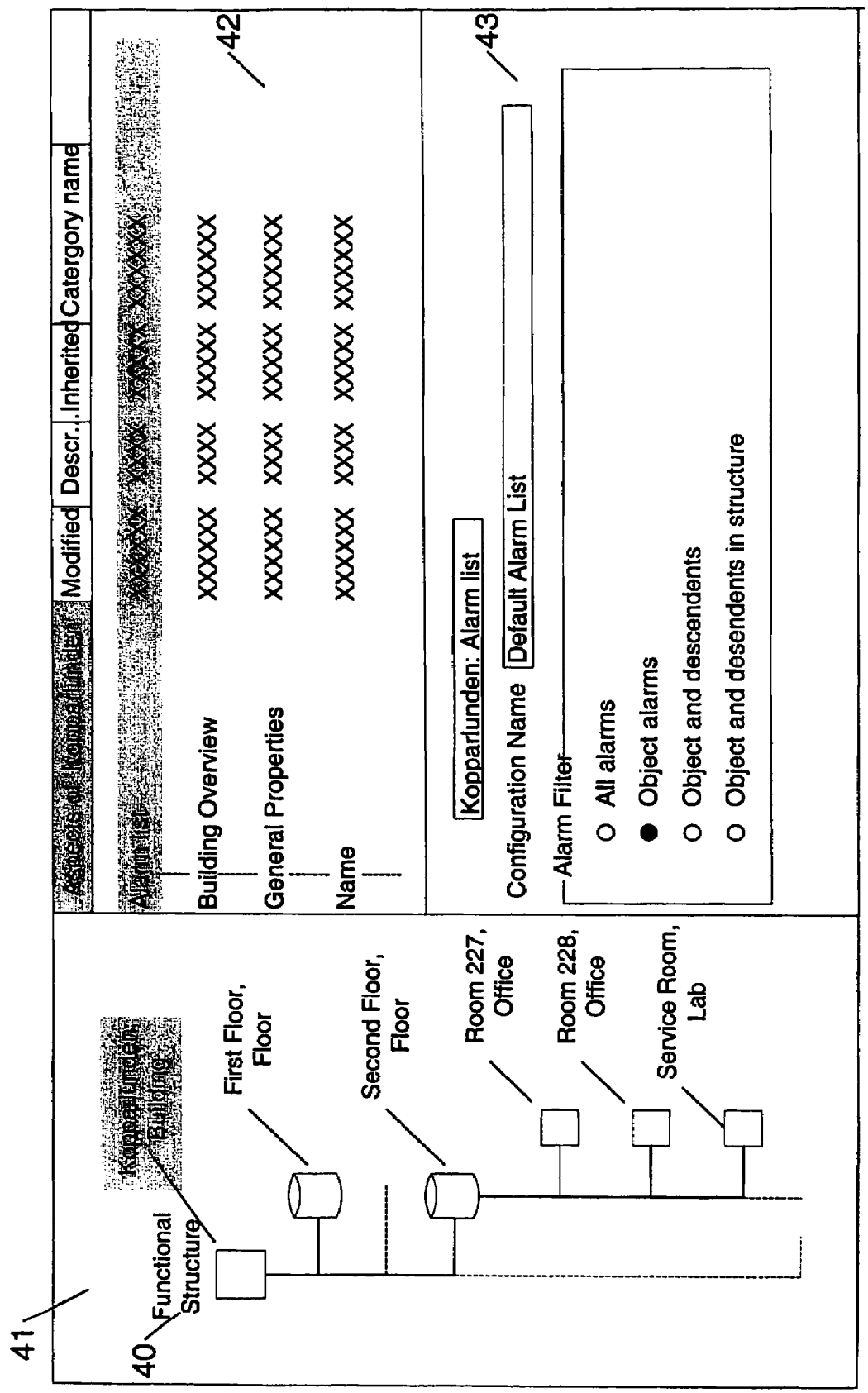
FIGS. 6 and 7 are examples of graphical user interfaces that may be displayed for an operator.

FIG. 6 shows an example of a graphical user interface that may be presented by the display means 7 of the user terminal 6 of FIG. 1. A functional structure 40 is presented in frame 41. The parent object of the functional structure 40 is shown to comprise a building referred to as 'Kopparlunden'.

The user has selected the parent object 'Kopparlunden'. The top right hand side frame 42 was then opened to the user, said frame presenting the aspects of the parent object 'Kopparlunden'. The user has then selected aspect 'Alarm list' and as a result an alarm list configuration frame 43 was presented for the user. The frame 43 then allows the user to select what type of alarms are to be reported by means of the above described messaging function.

Figure 7:
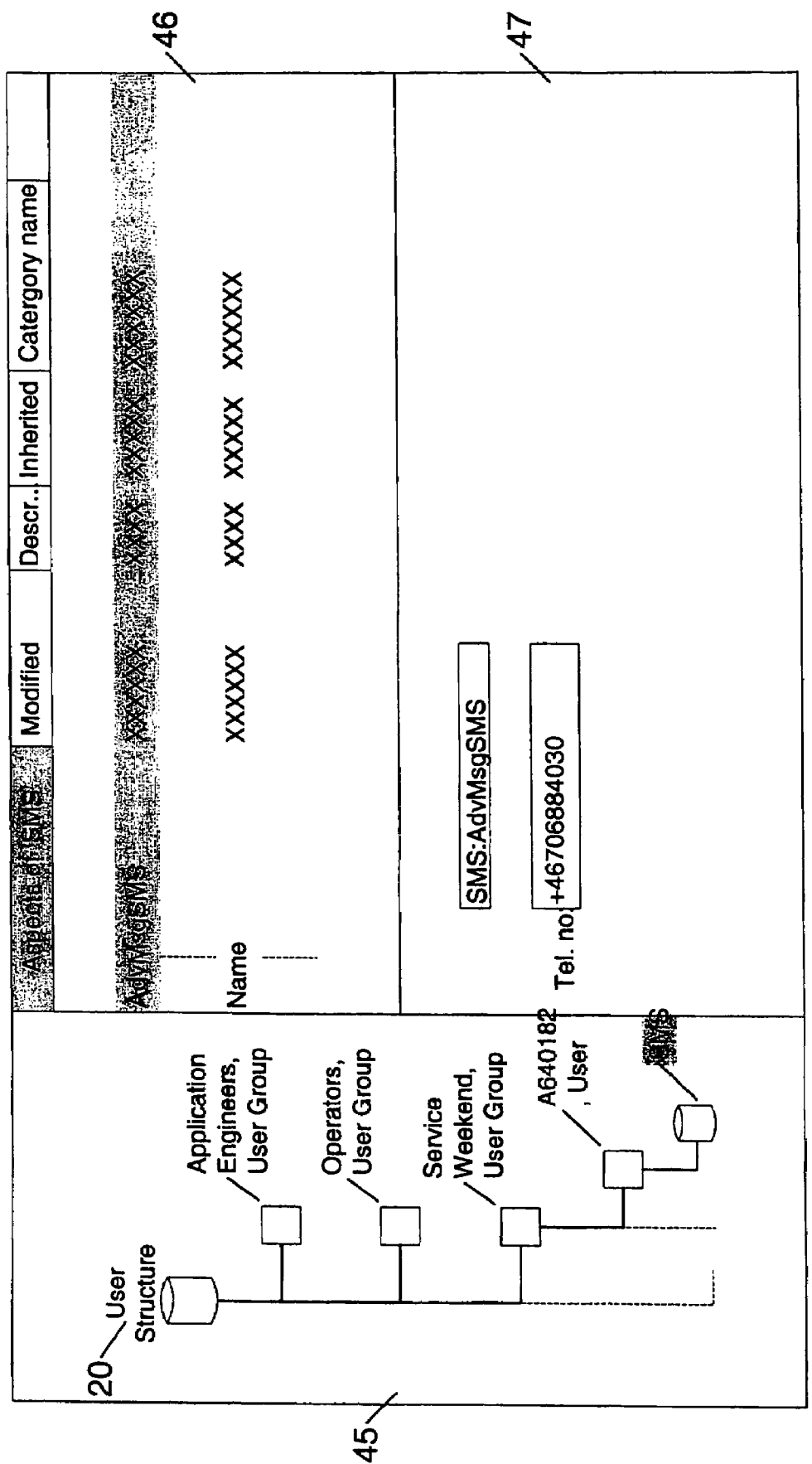

FIG. 7 shows another example of a graphical user interface that may be presented to a user. A user structure 20 is presented to the user by means of frame 45. The parent object of the user structure is shown to comprise object 'User Groups'. The user has selected object 'SMS' of user 'A640182'. This user belongs to weekend service personnel user group 'ServiceWeekend'.

The top right hand side frame 46 is opened for the user. The frame presents the aspects of said 'SMS' object. The user has selected further an aspect 'AdvMsgSMS'. As a result a configuration frame 47 is opened for the user. The frame 47 allows the user to modify properties of the SMS enabled device.

The SMS messages may comprise a string of characters. The character string may provide either an information in the form of a text message or a code string. The code string may be executable. If mark-up language messages are to the communicated, these may be based on any appropriate mark-up language such as those created based on the Standard Generalised Mark-up Language (SGML).

The messaging system may be adapted to study the object model described with reference to FIG. 2 to find out the relations various objects may have. Based on the study the messaging system may then select at least one recipient to which a message associated with a certain entity of the facility shall be communicated. For example, if a message is to be communicated to a group of recipients, the messaging system may accomplish automatic study of the object model to find related user objects in the user structure.

It shall be appreciated that although the above describes data objects representing real world entities it is also possible to configure a system wherein a data object represents an entity that comprises at least one other data object. Such a data object may be configured to generate an alarm indication or other indication resulting to communication of a message to a selected recipient.

It shall be appreciated that although the messages can be generated based on information from alarms they are not necessarily treated in a similar way as an alarm. For example, an acknowledgement of the receipt of an alarm message does not necessarily have the same effect as acknowledgement of an alarm.

It shall also be appreciated that although in the above the possible recipients 10 comprise operators and maintenance personnel these are only examples. Other types of recipients such as 'a service engineer', 'a manager', 'police', 'fire brigade', and so on are also possible. The recipient does not need to be a physical person. Instead, at least some of the possible recipients may comprise e.g. a role in an organisation (e.g. 'service engineer') or an organisation (e.g. 'fire brigade'). The recipient may also be another computerised system. An example of such is a higher level management system.

The above described messaging system enables sending of messages from the control system to different destinations such that a selected message can be sent to a selected destination terminal. The message may be information about an object alarm. The destination may consist of a user and/or a user device, and/or a group of users and/or user devices. The embodiments enable transportation of event related information to a selected recipient in a complex control system. The operator is selected based on an association between the operator and objects representing different entities of the facility. The recipient list can be easily configured. A fall back behaviour can be provided to improve the possibilities that at least one recipient receives the message.

It is noted herein that while the above describes exemplifying embodiments of the invention, there are several variations and modifications which may be made to the disclosed solution without departing from the scope of the present invention as defined in the appended claims.

The invention claimed is:

1. A messaging method for a system, said system comprising a processor adapted for object oriented data processing, a communicator configured to communicate with a plurality of recipients, and a message generator configured to generate messages, the method comprising:
generating a message associated with a monitored object representing a component of an industrial facility as a result of an event or alarm related to operation of the component,
associating at least one of the recipients with each object monitored,
associating at least one destination device with the at least one recipient,
selecting a first preferred recipient for the message in a predetermined manner from the at least one recipient associated with the monitored object,
selecting one of the destination devices from the at least one destination device associated with the selected first preferred recipient in a predetermined manner,
sending the message to the selected first preferred recipient and selected destination device associated with the selected first preferred recipient when an event or alarm in the facility occurs, and
selecting another recipient and a destination device associated with the other recipient or another destination device from the at least one destination device associated with the selected first preferred recipient in a predetermined manner if the message is not acknowledged by the selected first preferred recipient within a predefined time;
wherein a property of the monitored object includes an association to another object containing information associated with a communication media to be used for communication with the recipients.

2. The method according to claim 1, wherein a property of the monitored object includes information associated with user devices enabled to receive the message.

3. The method according to claim 1, wherein the monitored objects are arranged in at least two structures.

4. The method according to claim 3, wherein monitored objects are located in a functional structure and objects representing the recipients are positioned in a user structure.

5. The method according to claim 3, wherein the association between objects in said at least two structures are provided by an aspect of the object representing the component.

6. The method according to claim 1, wherein at least one of the objects is a meta object.

7. The method according to claim 1, wherein the selected first preferred recipient is in a messaging list associated with the monitored object.

8. The method according to claim 1, wherein the communicator sends verification if a message is to be sent to at least one recipient by the communicator.

9. The method according to claim 1, wherein the recipients comprise operators and/or maintenance personnel of the industrial facility and/or user devices.

10. The method according to claim 1, further comprising:
modifying said information regarding at least one monitored object.

11. The method according to claim 10, wherein the modifying comprises displaying a graphical user interface and reconfiguring at least one feature of the messaging system with said graphical user interface.

12. A control system configured to control components of an industrial facility, comprising:
a communicator configured to communicate with a plurality of recipients, and
a messenger configured to generate messages,
the control system further comprising:
a message generator configured to generate a message associated with a monitored object representing one of the components of the industrial facility as a result of an event or alarm related to the component,
an association between at least one recipient and each component of the industrial facility monitored,
an association between at least one destination device and the at least one recipient, a selector configured to select a first preferred recipient for the message in a predetermined manner from the at least one recipient associated with the monitored object, a selector configured to select one of the destination devices from the at least one destination device associated with the selected first preferred recipient in a predetermined manner, a message sender configured to send the message to the selected first preferred recipient and selected destination device associated with the selected first preferred recipient when an event or alarm in the facility occurs, a selector configured to select another recipient and a destination device associated with the other recipient or another recipient device from the at least one destination device associated with the selected first preferred recipient in a predetermined manner if the message is not acknowledged by the selected first preferred recipient within a predefined time, and a user terminal operatively connected to the control system to receive user input to configure the control system;

wherein a property of the monitored object includes an association to another object containing information associated with a communication media to be used for communication with the recipients.

13. The control system according to claim 12, wherein the monitored objects are arranged in at least two structures.

14. The control system according to claim 12, wherein the monitored object is arranged in a functional structure and objects representing the recipients are arranged in a user structure.

15. The control system according to claim 12, wherein the association between objects in said at least two structures is provided by an aspect of the object representing the entity.

16. The control system according to claim 12, wherein at least one of the object is a meta object.

17. The control system according to claim 12, wherein the message sender is configured to send the message to the selected first preferred recipient in a messaging list associated with the object representing an entity for the system.

18. The control system according to claim 12, wherein the recipients comprise operators and/or maintenance personnel of the industrial facility and/or user devices.

19. A computer program, comprising:

a computer readable storage medium; and computer program instructions recorded on the computer readable storage medium and executable by a processor for carrying out a method configured to control components of an industrial facility, the method comprising:

generating a message associated with a monitored object representing a component of the industrial facility as a result of an event or alarm related to operation of the component, associating at least one of the recipients with each object monitored, associating at least one destination device with the at least one recipient, selecting a first preferred recipient for the message in a predetermined manner from the at least one recipient associated with the monitored object, selecting one of the destination devices from the at least one destination device associated with the selected first preferred recipient in a predetermined manner, sending the message to the selected first preferred recipient and selected destination device associated with the selected first preferred recipient when an event or alarm in the facility occurs, and selecting another recipient and a destination device associated with the other recipient or another recipient device from the at least one destination device associated with the selected first preferred recipient in a predetermined manner if the message is not acknowledged by the selected first preferred recipient within a predefined time;

wherein a property of the monitored object includes an association to another object containing information associated with a communication media to be used for communication with the recipients.

* * * * *

UNITED STATES PATENT AND TRADEMARK OFFICE
CERTIFICATE OF CORRECTION

| | |
|---|---|
| PATENT NO. | : 7,644,152 B2 |
| APPLICATION NO. | : 10/491406 |
| DATED | : January 5, 2010 |
| INVENTOR(S) | : Blanc et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1092 days.

Signed and Sealed this

Sixteenth Day of November, 2010

David J. Kappos
*Director of the United States Patent and Trademark Office*